United States Patent

Geibel et al.

[11] Patent Number: 5,510,026
[45] Date of Patent: Apr. 23, 1996

[54] FILTERING ARRANGEMENT INCLUDING A NON-REENTRANT SHAPE

[75] Inventors: Stephen A. Geibel, Cortland; Scott D. Hopkins, Dryden; William L. Murphy, Homer; John D. Miller, Ithaca, all of N.Y.

[73] Assignee: Pall Corporation, East Hills, N.Y.

[21] Appl. No.: 408,191

[22] Filed: Mar. 22, 1995

Related U.S. Application Data

[63] Continuation of Ser. No. 888,206, May 26, 1992, abandoned.

[51] Int. Cl.$^6$ .................................................. B01D 27/08
[52] U.S. Cl. ........................... 210/232; 210/455; 210/497
[58] Field of Search ..................... 210/232, 236, 210/238, 435, 451, 455, 460, 497.01, 497.2

[56] References Cited

U.S. PATENT DOCUMENTS 4,170,556  10/1979  Pall .
4,295,525  10/1981  Swift, Jr. et al. .
4,608,166   8/1986  Cain ....................................... 210/232
4,623,456  11/1986  Ratner ................................... 210/232
4,865,727   9/1989  Krauss ................................... 210/238
4,961,850  10/1990  Combest ................................ 210/232
5,035,797   7/1991  Janik ..................................... 210/232

FOREIGN PATENT DOCUMENTS 2209593   7/1974  France .......................... B01D 27/00
1297651  11/1969  United Kingdom .
2075364  11/1981  United Kingdom .......... B01D 27/08

Primary Examiner—Robert A. Dawson
Assistant Examiner—W. L. Walker
Attorney, Agent, or Firm—Leydig, Voit & Mayer

[57] ABSTRACT

The disclosure describes a filter arrangement comprising a fitting and a filter assembly. The filter assembly includes an end tap and the end cap has a wall defining a bore. The fitting and the wall of the bore are fitted to one another by thermal expansion and contraction under elastic stress. At least one of the fitting and the wall of the bore has a non-reentrant shape shaped to resist longitudinal movement on the fitting within the bore and longitudinally secure and seal the filter assembly to the fitting.

62 Claims, 3 Drawing Sheets

FILTERING ARRANGEMENT INCLUDING A NON-REENTRANT SHAPE

This application is a continuation of application Ser. No. 07/888,206, filed May 26, 1992, now abandoned.

FIELD OF THE INVENTION

The invention relates generally to filter assemblies, and, more particularly, to methods and arrangements for providing a leak-tight seal between a filter cartridge and housing, and securing the filter cartridge to the housing.

BACKGROUND OF THE INVENTION

In filter assemblies, a filter cartridge is generally disposed within and secured to a housing. The filter cartridge is often secured to the housing by separate components, such as tie rods, or flanges and bolts, or the like. These separate components, however, result in added inventory and equipment expenses, as well as assembly costs.

The filter cartridge is typically tightly sealed to the housing at its inlet or outlet to preclude the bypassing of fluid or contaminants. Replacement of the filter cartridge may be accomplished by replacing the entire filter assembly in a housing that has been permanently closed, for example, by welding. Alternately, in assemblies where the housing is not permanently sealed, the filter may be removed from the housing for separate replacement or disposal.

Filter cartridges generally comprise a filter material and one or more end caps. Filter cartridge end caps are frequently constructed of polymeric materials, while housings are generally metal or the like. The filter cartridge is often sealed to the housing by means of an separate elastomeric material disposed between mating surfaces of the end cap and the housing. Such elastomeric seals are typically flat or O-ring gaskets disposed between annular surfaces of the end cap and the housing.

A number of disadvantages are associated with arrangements which utilize extraneous securing devices or gaskets, such elastomeric seals. For example, in order to accommodate piston-type O-ring seals, grooves or complex crevices must generally be molded or machined in the annular surface of the end cap. Similarly, where extraneous securing devices are utilized, the housing and/or the filter cartridge must be molded or machined to accommodate the extraneous devices. Manufacture of these components may require more complex tooling or additional operations, and, therefore, results in additional costs. Further, crevices in such designs often provide a dead volume that may be undesirable for filtration of ultrapure gas systems.

Additionally, elastomeric seals, and piston-type O-ring seals in particular, have a relatively low resistance to relative longitudinal motion of the mating parts. Relative motion between components can chafe the components and generate debris within the flow path. In more extreme situations, the filter may be forced off the mating housing fitting by reverse flow, or system "hammer." Consequently, the filter assembly often includes additional means for preventing longitudinal movement of the filter cartridge within the housing, as, for example, by a mechanical interlock.

Further, elastomeric materials are often subject to outgassing under certain conditions. This phenomenon is particularly troublesome in high purity gas filtration, such as in the manufacture of electronic chips. In chip manufacture, the filter elements are typically constructed entirely of TEFLON® PFA. Consequently, it may be difficult to provide an effective seal between the filter end cap and the housing. Moreover, elastomeric seals, as well as extraneous securing devices, may be a source of contamination and potential chemical incompatibility.

OBJECTS OF THE INVENTION

It is a primary object of the invention to provide a filter assembly arrangement in which a filter end cap is effectively sealed to a housing without the use of a gasket. More particularly, it is an object of the invention to provide an effective sealing arrangement that alleviates the disadvantages incumbent with the use of such seals.

Another primary object is to secure a filter assembly to a housing without the use of extraneous structures.

Another object is to provide filter assembly that includes a minimal number of components and may be easily and economically manufactured and assembled.

An additional object is to provide a sealing and securing arrangement having improved structural integrity. A related object is to provide a sealing arrangement that is resistant to relative longitudinal motion of mating components, and does not require the use of external supports, such as mechanical interlocks, to prevent relative longitudinal motion. A related object is to provide an arrangement that seals and secures a filter assembly to a housing.

Yet another object is to provide a sealing arrangement that minimizes the compatibility considerations between the construction materials and the fluids to be filtered. A further object is to provide a filter arrangement that does not introduce additional sources of contamination, such as those introduced by out-gassing of elastomeric O-rings or gases retained in the dead volume presented by grooves provided for O-rings.

BRIEF SUMMARY OF THE INVENTION

In accomplishing these and other objectives of the invention, there is provided a filter assembly arrangement wherein an end cap engages a fitting as a result of thermal expansion and contraction, effectively sealing and securing the end cap to the fitting.

In accordance with the one aspect of the invention, a filter arrangement comprises a fitting and a filter assembly. The filter assembly includes an end cap and the end cap has a wall defining a bore. The fitting and the wall of the bore are fitted to one another by thermal expansion and contraction under elastic stress. At least one of the fitting and the wall of the bore has a non-reentrant shape shaped to resist axial movement of the fitting within the bore and axially secure and seal the filter assembly to the fitting.

In accordance with another aspect of the invention, a filter arrangement comprises a fitting and a filter assembly mounted to the fitting. The fitting includes a portion having a non-reentrant shape. The filter assembly includes a filter and an end cap mounted to the filter and having a wall which defines a bore. The end cap is expandable to a first size at a first predetermined temperature wherein the bore is large enough to accept the non-reentrant portion of the fitting, and the end cap is contractible to a second size at a second predetermined temperature wherein the wall of the end cap is sealed tightly about the non-reentrant portion of the fitting.

In accordance with a further aspect of the invention, a filter arrangement comprises a housing assembly and a filter assembly. The housing assembly includes a housing chamber having an aperture and a hollow fitting extending from the aperture into the housing chamber. The hollow fitting has an outer surface with a non-reentrant shape. The filter assembly is disposed in the housing chamber and includes a filter material and an end cap connected to the filter material. The end cap has a bore with a wall. The wall is sealed tightly about the outer surface of the fitting by an interference fit at ambient temperatures, and the end cap and the fitting are joined to one another by thermal expansion and contraction of at least one of the end cap and fitting.

In accordance with a still further aspect of the invention, a filter assembly arrangement comprises a housing assembly and a filter assembly. The housing assembly includes a housing chamber having at least two apertures defining a flow path through the chamber. The housing assembly further includes at least one extension disposed within the housing chamber at one of the apertures, and the extension has an internal bore through which flow proceeds. The extension also has a non-reentrant shaped portion which extends into the housing chamber, and a non-reentrant shaped portion of the extension is defined by an outer diameter. The filter assembly comprises a filter material and at least one end cap. The end cap includes a substantially annularly shaped bore defined by a wall having an inner diameter. The inner diameter of the bore wall is smaller than the outer diameter of the non-reentrant shaped portion of the extension at ambient temperatures when the non-reentrant shaped portion is not disposed within the end cap bore. The filter assembly is disposed within the housing chamber in the flow path, and the non-reentrant shaped portion is disposed within the end cap bore during use. The extension and the end cap are joined to one another by thermal expansion and contraction such that there is an interference between the inner diameter and the outer diameter that induces stress in the end cap. The end cap bore and the non-reentrant shaped portion of the extension are sealed to one another under elastic stress at ambient temperatures so that the end cap fits tightly to the non-reentrant shaped portion without the presence of a sealing member.

In order to assemble the end cap and the housing extension, either the end cap is heated to expand the bore, or the housing extension is cooled to contract and reduce the outer diameter of the extension. The components are then assembled and returned to room temperature or ambient temperature to provide a seal as a result of the interference contact between the components. By calculating the theoretical stress and strain induced in the end cap and/or the housing extension, both initially and following a given creep time, the optimal dimensions of the end cap and the extension may be selected to provide maximum sealing force between the components after creep by selecting components with dimensions that provide the maximum residual stress in the end cap and/or the housing extension after creep.

The filter assembly arrangement does not require the use of a gasket to seal the filter cartridge to the housing. Further, the arrangement does not generally require the use of extraneous structures for securing the filter cartridge to the housing. (It will be appreciated, however, that it may be desirable to support the weight of an extremely large or heavy filter cartridge to prevent undue stress on the seal.) Thus, the simplified arrangement minimizes the number of components required and simplifies the design of the components themselves, which reduces both manufacturing and assembly costs. For example, by the elimination of a gasket, the end cap and extension may be more easily fabricated, as no complex finishing operations are required. Similarly, as the arrangement does not necessitate the use of extraneous support structures, the components do not require complex provisions for securing the filter cartridge to the housing. Consequently, the tooling required is greatly simplified and manufacturing costs reduced.

Further, the arrangement alleviates many disadvantages associated with the use of extraneous support structures, elastomeric seals or the like. In reducing the number of materials utilized in the arrangement, compatibility considerations between filter assembly materials and the fluids to be filtered are minimized. Further, sources of contamination, such as those introduced by the out-gassing of elastomeric seals or by gasses retained in the grooves provided for elastomeric seals, are likewise minimized Additionally, the filter assembly arrangement exhibits improved structural integrity of the seal itself. As the assembly has high resistance to relative movement between mating components, the sealing arrangement does not require the use of external supports to prevent relative longitudinal motion. Thus, the arrangement both seals and secures the filter assembly to the housing.

These and other features and advantages of the invention will be more readily apparent upon reading the following description of a preferred exemplified embodiment of the invention and upon reference to the accompanying drawings wherein:

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
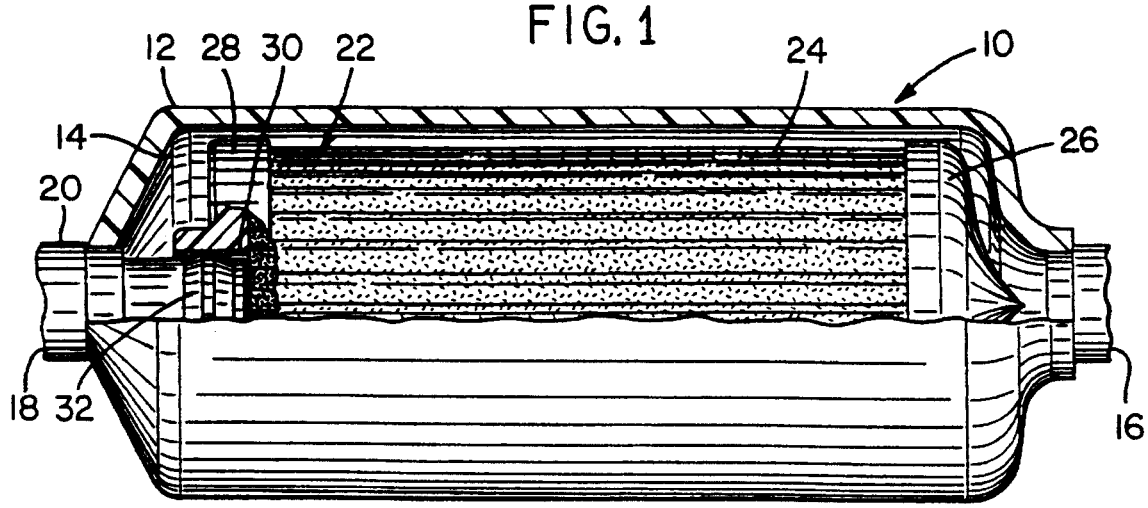
FIG. 1 is a plan view of a filter arrangement embodying the teachings of the invention. The filter arrangement is partially broken away to show the filter assembly.

Turning now to the drawings, there is shown in FIG. 1 a filter arrangement 10 comprising a housing 12, which includes a hollow housing chamber 14 with flow apertures 16, 18 that provide an inlet and an outlet through which fluid may flow into and out of the housing 12 to establish a flow path through the housing 12. (Although the following description refers to fluid flowing through the filter arrangement, the term "fluid" is intended to encompass both liquids and gases, or combinations thereof.) While the housing 12 illustrated incorporates the flow apertures 16, 18 at either end of the housing chamber 14, it will be appreciated that the flow apertures might alternately be provided at different positions within the housing.

The housing 12 further comprises a extension that extends into the housing chamber 14. In the embodiment shown, the extension is in the form of a fitting, which may be sealed to the housing 12 at one flow aperture 18 by any appropriate means. It will be appreciated, however, that the extension could alternately be in the form of an extension of the housing material itself, which protrudes into the housing chamber. While the fitting 20 could be disposed at either the inlet or outlet end of the housing 12, for the purposes of explanation, the filter arrangement 10 will be described as though the fitting 20 is disposed at the outlet end of the housing 12. Moreover, although the embodiment illustrated includes only one fitting 20, it will be appreciated that the arrangement could include fittings disposed within the flow apertures at both the inlet and outlet ends.

The fitting 20 may be constructed from a variety of metal materials including alloys, various metals, and combinations of metals and metal alloys. For example, nickel/chromium alloys, such as the Hastelloys, the Monels, and the Inconels are preferred. Of these, due to their corrosion-resistant properties, stainless steel alloys are preferred fitting materials. Similarly, however, metallic materials such as aluminum, magnesium, or the like, may likewise be suitable. It will further be appreciated that the fitting 20 could likewise be constructed of an alternate appropriate non-metallic material.

In order to filter fluid flowing through the housing 12, a filter cartridge 22 is disposed in the flow path within the housing 12. The filter cartridge 22 generally comprises a filter medium 24 to which one or more end caps 26, 28 are coupled. The filter medium 24 may comprise a porous membrane, or a woven or non-woven fibrous material, or other suitable material. While the end caps 26, 28 are generally fabricated of a polymeric material such as a fluorocarbon resin, it will be appreciated that they may be constructed from an alternate material, which exhibits desirable expansion and temperature characteristics. The filter cartridge 22 illustrated includes a cylindrical pleated filter 24 to which are coupled a blind end cap 26, and an end cap 28 having a bore 30. In this embodiment, the fluid flowing through the housing 12 is filtered as it flows outside in through the filter 24 and then the bore 30 or through the bore and inside out through the filter 24.

It will be appreciated that the filter cartridge and its components may be of alternative designs. For example, the filter may be of a cylindrical non-pleated design, or stacked thin plate design. Further, the cartridge may include bores in both end caps with the filter disposed therebetween so that fluid flows through one bore, the filter, and out the other bore. Alternatively, the filter may be of a "can" type design, and the cartridge may include only one end cap having a bore.

In order to ensure that fluid is purified by flowing through the filter 24, at least one end cap 28 is sealed to the housing 12. This is generally accomplished by sealing the substantially annularly shaped bore 30 of the end cap 28 to a substantially annularly shaped portion or end 32 of the fitting 20 that extends into the housing chamber 14.

In accordance with the invention, there is provided a filter arrangement 10 and a method of securing and sealing an end cap 28 to a housing fitting 20. The inventive sealing arrangement does not require the use of additional sealing materials such as an O-ring or flat ring gasket in order to provide an effective seal between the components. Rather, the internal diameter of the bore 30 of the end cap 28 (ID, shown in FIG. 2) is smaller than the outer diameter of the end 32 of the fitting 20 (OD, shown in FIG. 2) to present an interference fit at ambient temperatures. The end cap 28 is installed on the fitting 20 by heating the end cap 28 to a first predetermined temperature to expand the internal diameter (ID) of the bore 30, and/or cooling the fitting 20 to reduce its outer diameter (OD) and slipping the parts together. (In the example that follows, an end cap fabricated from a TEFLON® PFA material and heated to 525° F. to expand the internal diameter.) The assembly is then permitted to return to a second predetermined temperature, such as ambient temperature. As the end cap 28 cools and the bore 30 contracts and/or the male fitting 20 heats and expands, intimate thermal contact is established between the surfaces of the end cap bore 30 and the housing fitting 20 to maintain the components in sealing engagement.

While the end 32 of the fitting 20 that extends into the housing chamber 14 and the bore 30 of the end cap 28 have been described as preferably substantially annularly shaped, it will be appreciated that the end 32 and the bore 30 may be of an alternate shape, so long as they may be assembled to provide an interference fit, which provides a stable seal between the components.

Figure 2:
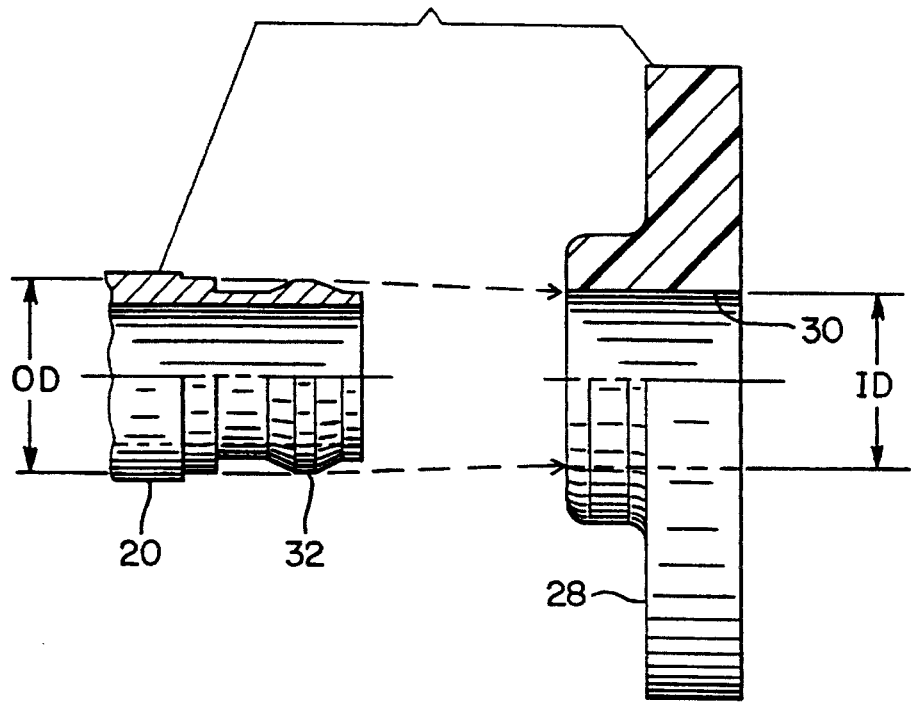
FIG. 2 is an enlarged fragmentary view of the filter arrangement of FIG. 1 cut away and exploded to show the fitting and end cap.

In a currently preferred embodiment of the invention, the end 32 is of a non-reentrant shape, i.e., the end 32 itself is shaped to resist movement once assembled into the bore 30. It will thus be appreciated that the shape of the end 32 itself increases the effectiveness of the seal and increases the resistance of the filter cartridge 22 to longitudinal movement relative to the housing 12. As shown in FIGS. 1 and 2, the OD of the end 32 includes an annular extension along that portion which is centrally disposed within the bore 30 once assembled. The annular surface of the end 32 bevels outward to a substantially flat annular surface, or to form a spherical section. This arrangement is particularly desirable because it may be easily machined. While the bore 30 may comprise a mating annular recess, the preferred embodiment of the invention includes a cylindrically shaped bore 30.

This method of sealing the components together, and the non-reentrant shape of the end 32 in particular, likewise assists in securing the filter cartridge 22 to the housing 12. Generally, no additional securing devices, such as tie rods or the like, will be required to further secure the cartridge 22 to the housing 12. It will be appreciated, however, that in filter assembly designs requiring the use of relatively large or heavy filter cartridges, it may be desirable to provide additional support for the cartridge at the end opposite the fitting 20. Such additional support may likewise be desirable when the filter assembly is utilized in environments with large range of pressure transients, for example in applications where the filter assembly will experience excessive hammer or shock. Such support may be provided by simple dimples or the like in the housing which protrude into the housing chamber and contact the filter cartridge 22.

According to an important aspect of the invention, the end cap 28 and the end 32 are dimensioned such that the elastic stresses that remain in the components as a result of the interference fit are optimal throughout the life of the assembly 10. In order to determine the optimal initial dimension of the end cad bore 30 relative to of the end 32, the initial and residual stress and strain induced in the end cap 28 and/or the end 32 the fitting 20 as a is close to the interference must be considered. For our poses of explanation, only the stress and strain induced in the end cap will be considered because the modulus of elasticity of the end cap 28 is typically much greater than that of the fitting 20. Where the modulus of elasticity of the fitting 20 is close to or greater than that of the end cap 28, then the stress and strain induced in both the fitting 20 and the end cap 28 may be considered and analogous considerations apply.

Representative sizes of an end cap fabricated from the currently preferred TEFLON® PFA material and a stainless steel fitting will be will be used as an example. TEFLON® PFA is currently preferred because of its desirable high temperature properties; TEFLON® PFA can withstand relatively high temperatures without melting. It will be appreciated, however, that other polymeric materials, such as polypropylenes or polyesters could likewise be utilized. Thus, there is no intention to limit the invention to the specific materials mentioned or to the specific dimensions mentioned. Further, it is expected that the arrangement would be equally applicable to fitting and/or end cap bores on the order of ¼ to 2½ inches in diameter, or higher.

The following table summarizes calculations for the stress and strain induced in an end cap as result of different interference fits for several combinations of end cap ID and fitting OD. The table shows the initial stress and strain, as well as the residual stress and strain after 10,000 hours at room temperature.

| DIMENSIONS | | INITIAL | | CREEP 10K Hrs. @ Room Temp. | |
|---|---|---|---|---|---|
| Fitting O.D. (in.) | End Cap I.D. (in.) | Strain (in./in.) | Stress (psi) | Strain (%) | Stress (psi) |
| .299 | .271 | .103 | 1033 | 2.5 | 764 |
| .301 | .269 | .119 | 1190 | 3 | 864 |
| .303 | .267 | .135 | 1348 | 4 | 912 |
| .305 | .265 | .151 | 1509 | 5 | 961 |
| .307 | .263 | .167 | 1673 | 6.3 | 981 |
| .309 | .261 | .184 | 1839 | 8 | 962 |
| .311 | .259 | .201 | 2008 | 10 | 916 |

The initial stress and strain induced in the end cap may be determined with reference to the initial dimensions of the end cap and the dimensions of the end cap once installed on the fitting. The diameter strain ($\epsilon$) is calculated according to the following equation, wherein $\Delta D$ is calculated by determining the change in the ID as a result of the interference fit, and D is the initial ID:

$$\epsilon = \Delta D / D$$

The hoop stress ($\sigma$) may then be calculated by multiplying the diameter strain by the modulus of elasticity (E) for the particular material utilized in the end cap.

$$E = \sigma / \epsilon$$

As indicated above, the currently preferred embodiment of the invention utilizes an end cap 28 fabricated from TEFLON® PFA. The modulus of elasticity for this material is 10,000 psi.

Figure 3:
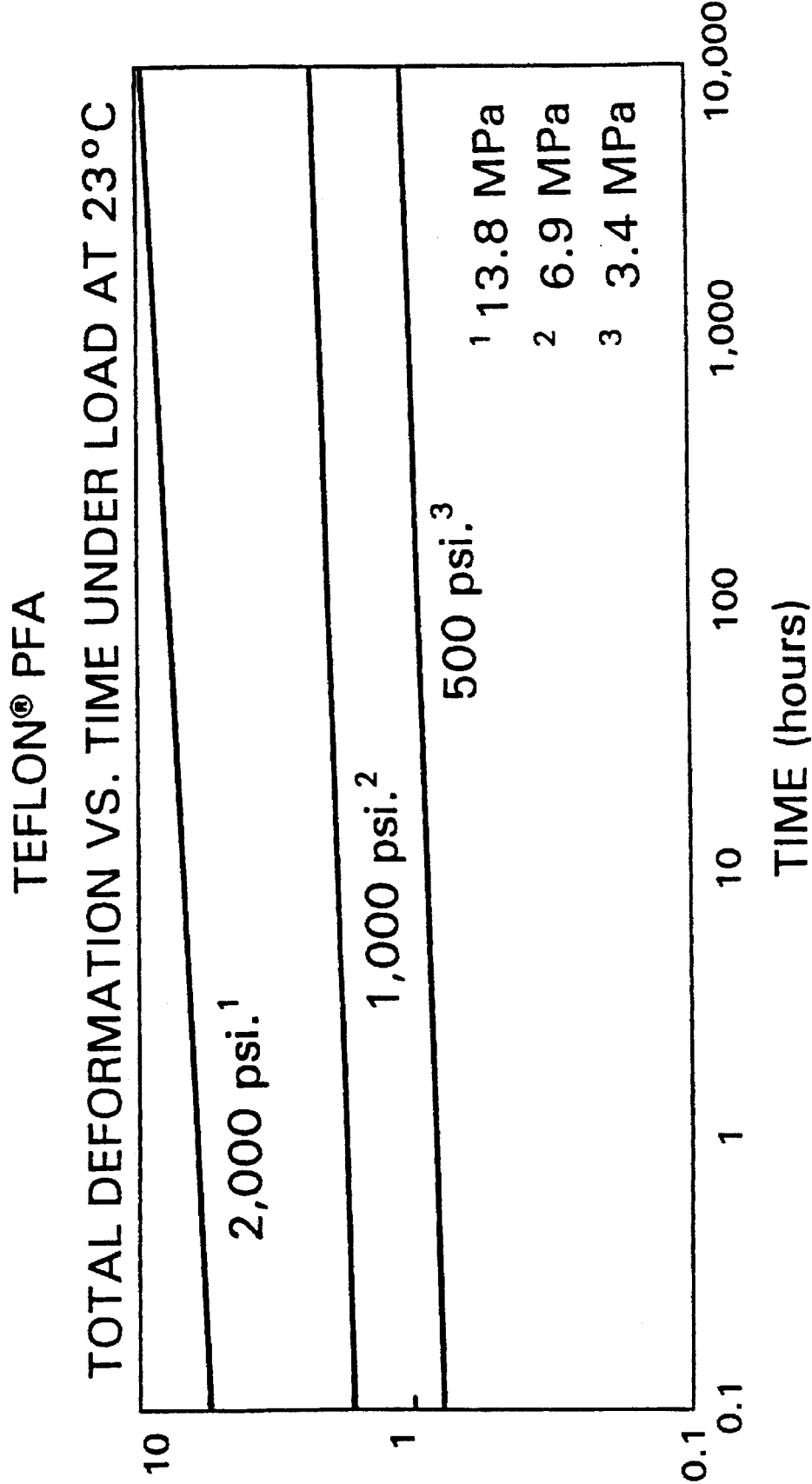
FIG. 3 is a diagram of the total deformation over time of a TEFLON® PFA fluorocarbon resin under load at 73° F. (23° C.).

The resultant deformation of the end cap over time may be determined with reference to the creep data illustrated in FIG. 3. This figure shows the tensile strain observed under various loads at room temperature (i.e., 73° F., or 23° C.). The creep observed, described as a percent strain under a given load, may be determined by interpolating the logarithmic scale. For example, it may be seen that after 10,000 hours, the tensile strain for a hoop stress of 1033 psi is on the order of 2.5%.

The residual stress remaining in the end cap after 10,000 hours may then be determined using the natural dimensions of the end cap after creep strain. This determination involves multi-step calculation. First, the natural dimensions of the end cap after 10,000 hours creep may be calculated according to the following equation:

initial ID+ (initial ID) (% strain at 10,000 hours)

For example, for the end cap having an initial ID of 0.271 in., the diameter after 10,000 hours creep will be calculated as follows:

0.271 in. +(0.271 in.)(2.5%)= 0.278 in.

Second, the diameter strain at 10,000 hours may be calculated as above using the new natural dimension of the end cap. Continuing with our example, for the end cap having an initial ID of 0.271 in., the diameter strain after 10,000 hours creep may be calculated as follows:

(0.299 in.–0.278 in.)/0.278 in. = 0.076 in./in.

Third, the residual stress after 10,000 hours creep may likewise be calculated as above, i.e., by multiplying the hoop stress by the modulus of elasticity. Returning to our example, the residual stress may be calculated as follows:

(0.076 in./in.)(10,000 psi)=764 psi

In the examples in the above table, we have assumed that the assembly will be maintained at room temperature for a preponderance of the life of the assembly. It will be appreciated, however, that there is no intention to limit the assembly to room temperature use. The resultant deformation, and, consequently, the residual stress could likewise be determined with reference to time deformation curves for loads applied at alternate temperatures. Moreover, in the preferred embodiment, generally the polymeric female end cap has a higher coefficient of expansion than the metal male fitting. Consequently, when subjected to elevated temperatures, the female end cap will not be over stressed and permanently deformed.

Figure 4:
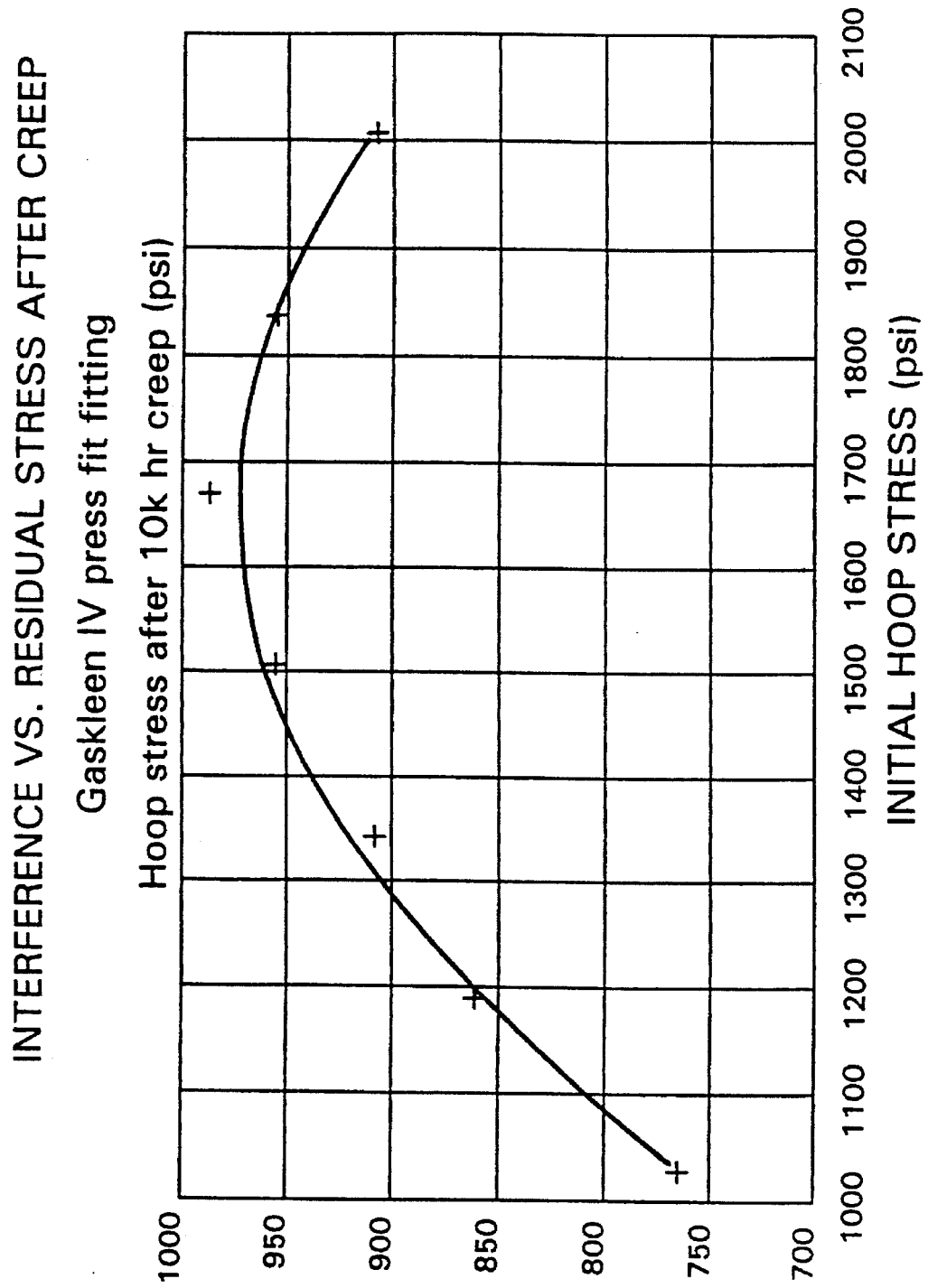
FIG. 4 is a diagram of the initial stress versus the residual stress after 10,000 hour creep for a representative end cap and fitting combination.

The preferred fitting and end cap combination is considered to be the combination for the end cap that exhibits maximum residual stress over the life of the part (i.e., optimal hoop stress after 10,000 hours creep). The maximum residual hoop stress is graphically illustrated in FIG. 4. The residual stress data for the representative end caps summarized in the table above are plotted as a function of initial stress. It will be appreciated that, generally, the dimensions for the fitting and end cap corresponding to the uppermost point of the curve will provide the optimal interference fit for residual stress. In this sample set of calculations, the end cap exhibiting the optimal residual stress after 10,000 hours at room temperature will be the end cap with an initial stress of 1673 psi, or the end cap with an inner diameter of 0.263 inches assembled on a fitting with an outer diameter of 0.037 inches.

Taking into account the practical considerations of manufacturing, the initial and residual stress and strain at the design tolerances may be calculated according to the methods explained above. The following table summarizes calculations for the stress and strain induced in the representative optimal dimension end cap (ID=0.262 –0.003 in.) and fitting (OD=0.305 =/– 0.002 in.). Also provided in the following table are the dimensions of the inner diameter of the end cap after 10,000 hours at room temperature. It may be seen that the end cap will retain sufficient residual stress to provide an interference fit between the components and maintain the integrity of the seal.

| DIMENSIONS | | INITIAL | | CREEP 10K Hrs. @ Room Temp. | | |
|---|---|---|---|---|---|---|
| Fitting O.D. (in.) | End Cap I.D. (in.) | Strain (in./in.) | Stress (psi) | Strain (in./in.) | Stress (psi) | End Cap I.D. (in.) |
| .303 | .265 | .143 | 1434 | 4.5 | 942 | .277 |
| .307 | .259 | .185 | 1853 | 8 | 975 | .280 |

Further, the assembly may be utilized at higher temperatures, while maintaining the integrity of the seal. As will be seen from the following dimensions, the end cap and fitting will maintain an interference fit after 10,000 hours at 392° F. (The dimensions of the components may be calculated as above.)

| INITIAL DIMENSIONS | | CREEP 10K Hrs. @ 392° F. | |
|---|---|---|---|
| Fitting O.D. (in.) | End Cap I.D. (in.) | Fitting O.D. (in.) | End Cap I.D. (in.) |
| .303 | .265 | .304 | .285 |
| .307 | .259 | .308 | .288 |

Because the disclosed design does not utilize a gasket, its manufacture does not require complex tooling or machining operations. Thus, those skilled in the art will appreciate that the described end cap and fitting may be more easily and economically manufactured than assemblies that include a gasket.

The practical considerations of assembly must likewise be taken into account in the design of the end cap and fitting. In order to ensure that the optimal end cap and fitting combination may be readily assembled, the dimensions of the end cap after heating may be calculated using the coefficient of thermal expansion (e) in in./in./°F., according to the following equation, wherein D is the initial diameter of the end cap in inches, Δ is the change in temperature in °F., and δ is the resultant change in diameter in inches:

$$\delta = \alpha D \Delta T$$

The coefficient of thermal expansion is relatively constant for a considerable range of temperatures. In general, the coefficient increases with an increase of temperature. For TEFLON® PFA material, the coefficient of thermal expansion is as follows:

| 70°–212° F. | $\alpha =$ | 7.6 $(10^{-5})$ in./in./°F. |
|---|---|---|
| 212°–300° F. | $\alpha =$ | 9.2 $(10^{-5})$ in./in./°F. |
| 300°–525° F. | $\alpha =$ | 11.5 $(10^{-5})$ in./in./°F. |

(Alternate materials exhibit higher or lower coefficients of thermal expansion. For example, virgin homogeneous polypropylene has a coefficient of thermal expansion on the order of 5.0 $(10^{-5})$ in./in./°F., while a polyester material has a coefficient of thermal expansion on the order of 3.3 –5.2 $(10^{-5})$ in./in./°F. It will be appreciated, however, that the temperature of the environment in which an end cap may be utilized will be limited by the coefficient of thermal expansion of the material from which the end cap is fabricated.)

The following reflects the dimensions of the representative end caps (at the design tolerance extremes identified above) at 525° F. While representative components in our example provide an interference fit during assembly, the end caps and fittings can be readily assembled.

| Fitting O.D. (in.) | End Cap I.D. (in.) |
|---|---|
| .303 | .277 |
| .307 | .271 |

Further, it has been experimentally determined that the components may be readily assembled at significantly lower temperatures. As the end cap is heated, it becomes sufficiently soft to permit assembly to the fitting regardless of the interference. The following reflects the dimensions of the representative end caps (at the design tolerance extremes identified above) at 300° F. Although a residual interference exists to provide a snug fit, the components may be readily assembled.

| Fitting O.D. (in.) | End Cap I.D. (in.) |
|---|---|
| .303 | .270 |
| .307 | .264 |

In summary, the filter assembly arrangement and the method of sealing the filter end cap 28 to the housing 12 is accomplished as a result of thermal contraction of the end cap 28 and/or expansion of the end 32 of the fitting 20. The optimal dimension of the components may be calculated to provide maximum residual stress within the end cap 28 and/or the end 32 of the fitting 20 over the life of the filter cartridge 22. In utilizing a thermally engaged seal, the assembly does not require an additional gasket. As a result, the invention alleviates many of the disadvantages associated with the use of gaskets, such as elastomeric seals.

We claim as our invention:

1. A filter arrangement comprising a fitting including a portion having a non-reentrant shape and a filter assembly mounted to the fitting, the filter assembly including a filter and an end cap mounted to the filter and having an end cap wall defining a bore, the end cap being expandable to a first size at a first predetermined temperature wherein the bore is large enough to accept the non-reentrant portion of the fitting and being contractible to a second size at a second predetermined temperature wherein the wall of the end cap is sealed tightly about the non-reentrant portion of the fitting.

2. The filter arrangement of claim 1, wherein one of the end cap and the non-reentrant portion of the fitting is fabricated from a polymeric material and the other of the end cap and the non-reentrant portion of the fitting is fabricated from a metallic material.

3. The filter arrangement of claim 2, wherein the bore of the end cap has a cylindrical shape along an axis of the bore where the bore wall is sealed to the fitting.

4. The filter arrangement of claim 3, wherein the portion of the fitting having the non-reentrant shape extends outward to a substantially flat annular surface.

5. The filter arrangement of claim 4, further comprising a housing assembly including a housing chamber having an aperture communicating with the fitting, and wherein the filter assembly is disposed in the housing chamber in a flow path defined by the aperture.

6. The filter arrangement of claim 5, wherein the portion of the fitting having the non-reentrant shape has an outer diameter greater than the inner diameter of the bore of the end cap before the fitting is disposed in the bore, the end cap and the fitting being joined to one another by thermal expansion and contraction of at least one of the end cap and the fitting to create a thermal interference fit for providing a leak tight seal between the filter assembly and the fitting and securing the filter assembly to the fitting.

7. The filter arrangement of claim 6, wherein the filter assembly further includes a blind end cap mounted to the filter.

8. The filter arrangement of claim 5, wherein a portion of the fitting has the non-reentrant shape and the non-reentrant portion extends outward to form a spherical surface.

9. The filter arrangement of claim 1, wherein at least one of the end cap and fitting is fabricated from a material that thermally expands and contracts.

10. The filter arrangement of claim 9, wherein the material includes a polymeric material.

11. The filter arrangement of claim 9 wherein the material includes a metallic material.

12. The filter arrangement of claim 1, further comprising a housing assembly including a housing chamber having an aperture communicating with the fitting, and wherein the filter assembly is disposed in the housing chamber in a flow path defined by the aperture.

13. The filter arrangement of claim 12, wherein the portion of the fitting having a non-reentrant shape has an outer diameter greater than the inner diameter of the bore of the end cap before the fitting is disposed in the bore, the end cap and the fitting being joined to one another by thermal expansion and contraction of at least one of the end cap and the fitting to create a thermal interference fit for providing a leak tight seal between the filter assembly and the fitting and securing the filter assembly to the fitting.

14. The filter arrangement of claim 1, wherein the bore of the end cap has a cylindrical shape along an axis of the bore where the bore wall is sealed to the fitting.

15. The filter arrangement of claim 1, wherein the bore wall comprises a mating annular recess which sealably engages the non-reentrant portion of the fitting.

16. The filter arrangement of claim 1, wherein the portion of the fitting having the non-reentrant shape extends outward to a substantially flat annular surface.

17. The filter arrangement of claim 1, wherein the portion of the fitting having the non-reentrant shape extends outward to form a spherical surface.

18. A filter arrangement comprising:

a fitting, and a filter assembly including an end cap having a wall defining a bore, the fitting and the wall of the bore being fitted by thermal expansion and contraction under elastic stress to one another, wherein at least one of the fitting and the wall have a non-reentrant shape shaped to resist axial movement of the fitting within the bore and axially secure and seal the filter assembly to the fitting.

19. The filter arrangement of claim 18, wherein one of the end cap and the non-reentrant portion of the fitting is fabricated from a polymeric material and the other of the end cap and the non-reentrant portion of the fitting is fabricated from a metallic material.

20. The filter arrangement of claim 19, wherein the bore of the end cap has a cylindrical shape along an axis of the bore where the bore wall is sealed to the fitting.

21. The filter arrangement of claim 20, wherein a portion of the fitting has the non-reentrant shape and the non-reentrant portion extends outward to a substantially flat annular surface.

22. The filter arrangement of claim 21, further comprising a housing assembly including a housing chamber having an aperture communicating with the fitting, and wherein the filter assembly is disposed in the housing chamber in a flow path defined by the aperture.

23. The filter arrangement of claim 22, wherein the fitting comprises a portion having the non-reentrant shape for engagement with the bore of the end cap and wherein the non-reentrant portion has an outer diameter greater than the inner diameter of the bore of the end cap before the end cap is fitted to the fitting, the end cap and the fitting creating a thermal interference fit for providing a leak tight seal between the filter assembly and the fitting and securing the filter assembly to the fitting.

24. The filter arrangement of claim 23, wherein the filter assembly further includes a blind end cap mounted to the filter.

25. The filter arrangement of claim 18, wherein at least one of the end cap and fitting is fabricated from a material that thermally expands and contracts.

26. The filter arrangement of claim 25, wherein the material includes a polymeric material.

27. The filter arrangement of claim 25, wherein the material includes a metallic material.

28. The filter arrangement of claim 18, further comprising a housing assembly including a housing chamber having an aperture communicating with the fitting, and wherein the filter assembly is disposed in the housing chamber in a flow path defined by the aperture.

29. The filter arrangement of claim 28, wherein the fitting comprises a portion having the non-reentrant shape for engagement with the bore of the end cap and wherein the non-reentrant portion has an outer diameter greater than the inner diameter of the bore of the end cap before the end cap is fitted to the fitting, the end cap and the fitting creating a thermal interference fit for providing a leak tight seal between the filter assembly and the fitting and securing the filter assembly to the fitting.

30. The filter arrangement of claim 18, wherein the bore of the end cap has a cylindrical shape along an axis of the bore where the bore wall is sealed to the fitting.

31. The filter arrangement of claim 18, wherein the bore wall comprises a mating annular recess which sealably engages the non-reentrant portion of the fitting.

32. The filter arrangement of claim 18, wherein a portion of the fitting has the non-reentrant shape and the non-reentrant portion extends outward to a substantially flat annular surface.

33. A filter assembly arrangement comprising, in combination:

a housing assembly comprising a housing chamber having at least two apertures defining a flow path therethrough, the housing assembly further comprising at least one extension disposed within the housing chamber at one of the apertures, the extension having a non-reentrant shaped portion which extends into the housing chamber and an internal bore through which flow proceeds, the non-reentrant shaped portion of the extension being defined by an outer diameter, and a filter assembly comprising a filter material and at least one end cap, the end cap including a substantially annularly shaped bore defined by a wall having an inner diameter, the inner diameter of the bore wall being smaller than the outer diameter of the non-reentrant shaped portion of the extension at ambient temperatures when the non-reentrant shaped portion is not disposed within the end cap bore, the filter assembly being disposed within the housing chamber in the flow path, the non-reentrant shaped portion being disposed within the end cap bore during use, the extension and the ends cap being joined to one another by thermal expansion and contraction such that there is an interference between the inner diameter and the outer diameter that induces stress in the end cap, the end cap bore and the non-reentrant shaped portion of the extension being sealed to one another under elastic stress at ambient temperatures so that the end cap bore fits tightly to the non-reentrant shaped portion without the presence of a sealing member.

34. The filter assembly arrangement of claim 33 wherein the substantially annularly shaped portion of the extension is of a non-reentrant shape.

35. The filter assembly arrangement of claim 34 comprising an annular projection along an outer annular surface of the extension.

36. The filter assembly arrangement of claim 35 wherein the end cap comprises an annular recess along the inner diameter of the annular end cap bore, the annular projection being disposed within the annular recess.

37. The filter assembly arrangement of claim 34 wherein the annular surface bevels outward to a substantially flat annular surface.

38. The filter assembly arrangement of claim 34 wherein the annular surface bevels outward to form a spherical section.

39. The filter assembly arrangement of claim 33 wherein the end cap comprises a polymeric material.

40. The filter assembly arrangement of claim 39 wherein the polymeric material comprises TEFLON® PFA.

41. The filter assembly arrangement of claim 19 wherein the substantially annularly shaped portion of the extension is metal.

42. The filter assembly arrangement of claim 39 wherein the substantially annularly shaped portion of the extension is stainless steel.

43. The filter assembly arrangement as claimed in claim 33 wherein the annularly shaped portion of the extension comprises a fitting coupled to one of the apertures.

44. The filter assembly arrangement as claimed in claim 43 wherein the end cap bore and the fitting are engaged by raising the temperature of the end cap to facilitate the placement of the end cap bore over the fitting and returning the temperature of the end cap to ambient temperature to provide a thermally contracted seal.

45. The filter assembly arrangement as claimed in claim 43 wherein the end cap bore and the fitting are engaged by lowering the temperature of the fitting to facilitate the placement of the end cap bore over the fitting and returning the temperature of the fitting to ambient temperature to provide a thermally expanded seal.

46. The filter assembly arrangement as claimed in claim 33 wherein the end cap bore and the substantially annularly shaped portion of the extension are engaged by raising the temperature of the end cap to facilitate the placement of the end cap bore over the substantially annularly shaped portion of the extension and returning the temperature of the end cap to ambient temperature to provide the seal.

47. The filter assembly arrangement as claimed in claim 33 wherein the end cap bore and the substantially annularly shaped portion of the extension are engaged by lowering the temperature of the substantially annularly shaped portion of the extension to facilitate the placement of the end cap bore over the substantially annularly shaped portion of the extension and returning the temperature of the substantially annularly shaped portion of the extension to ambient temperature to provide the seal.

48. The filter assembly arrangement of claim 33 wherein the outer diameter and the inner diameter are relatively dimensioned to provide maximum residual stress in at least one of the extension and the end cap for maximum shelf life of the filter arrangement.

49. The filter assembly arrangement of claim 33 wherein the seal between the end cap bore and the annularly shaped portion of the extension seals and secures the filter assembly to the housing assembly.

50. The filter assembly arrangement of claim 33 wherein the interference induces a stress in the end cap which is below the yield stress of the material from which the end cap is fabricated.

51. A filter arrangement comprising:
a housing assembly including a housing chamber having an aperture and a hollow fitting extending from the aperture into the housing chamber, the hollow fitting having an outer surface with a non-reentrant shape, and
a filter assembly disposed in the housing chamber and including a filter material and an end cap connected to the filter material, the end cap having a bore with a wall, the wall being sealed tightly about the outer surface of the fitting by an interference fit at ambient temperatures, the end cap and the fitting being joined to one another by thermal expansion and contraction of at least one of the end cap and the fitting.

52. The filter arrangement of claim 51, wherein one of the bore wall and the non-reentrant shaped fitting comprises a polymeric material and the other of the bore wall and the non-reentrant fitting comprises a metallic material.

53. The filter arrangement of claim 52, wherein the bore of the end cap has a cylindrical shape along an axis of the bore where the bore wall is sealed to the fitting.

54. The filter arrangement of claim 53, wherein the non-reentrant shaped fitting extends outward to a substantially flat annular surface.

55. The filter arrangement of claim 54, wherein the filter assembly further includes a blind end cap mounted to the filter.

56. The filter arrangement of claim 51, wherein at least one of the end cap and hollow fitting is fabricated from a material that thermally expands and contracts.

57. The filter arrangement of claim 56, wherein the material includes a polymeric material.

58. The filter arrangement of claim 56, wherein the material includes a metallic material.

59. A filter arrangement as claimed in claim 51 wherein the bore wall has a recess which engages the outer surface of the fitting.

60. A filter arrangement as claimed in claim 51 wherein the bore wall has a constant shape along an axis of the bore where the bore wall is sealed to the fitting.

61. A filter arrangement as claimed in claim 51 wherein the outer surface of the fitting bulges outward from an axis of the fitting.

62. The filter arrangement of claim 51, wherein the non-reentrant shaped fitting has an outer diameter greater than the inner diameter of the bore of the end cap before the bore wall is sealed about the fitting.

\* \* \* \* \*